(12) United States Patent
Sangkyu et al.

(10) Patent No.: US 8,667,952 B2
(45) Date of Patent: Mar. 11, 2014

(54) METHOD AND DEVICE FOR CONTROLLING DIESEL ENGINE WITH FORCED INDUCTION SYSTEM

(75) Inventors: Kim Sangkyu, Higashihiroshima (JP); Daisuke Shimo, Hiroshima (JP); Kyotaro Nishimoto, Hiroshima (JP); Yoshie Kakuda, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 280 days.

(21) Appl. No.: 13/207,356

(22) Filed: Aug. 10, 2011

(65) Prior Publication Data

US 2012/0042849 A1 Feb. 23, 2012

(30) Foreign Application Priority Data

Aug. 20, 2010 (JP) ................................. 2010-185433
Apr. 14, 2011 (JP) ................................. 2011-090030

(51) Int. Cl.
*F02D 41/30* (2006.01)

(52) U.S. Cl.
USPC ......... 123/299; 123/559.1; 123/435; 123/436

(58) Field of Classification Search
USPC .............. 123/299, 300, 305, 559.1, 435, 436; 60/598, 603
See application file for complete search history.

(56) References Cited

U.S. PATENT DOCUMENTS

| | | | |
|---|---|---|---|
| 6,378,487 B1 * | 4/2002 | Zukouski et al. ............. | 123/299 |
| 6,484,689 B1 * | 11/2002 | Hasegawa ..................... | 123/299 |
| 6,901,747 B2 * | 6/2005 | Tashiro et al. .................. | 60/286 |
| 7,137,379 B2 * | 11/2006 | Sasaki et al. .................. | 123/299 |
| 7,532,971 B2 * | 5/2009 | Sasaki et al. .................. | 701/102 |
| 7,845,343 B2 * | 12/2010 | Imai .............................. | 123/674 |
| 7,861,686 B2 * | 1/2011 | Ogura et al. .................. | 123/299 |
| 8,175,789 B2 * | 5/2012 | Kojima et al. ................ | 701/104 |
| 8,181,626 B2 * | 5/2012 | Nada ............................. | 123/299 |
| 2005/0229903 A1* | 10/2005 | Kobayashi et al. ........... | 123/435 |
| 2011/0005491 A1* | 1/2011 | Terada et al. ................. | 123/299 |
| 2012/0000197 A1* | 1/2012 | Maruyama et al. .......... | 60/605.2 |
| 2012/0000441 A1* | 1/2012 | Nakai et al. .................. | 123/299 |
| 2012/0004826 A1* | 1/2012 | Shimo et al. ................. | 701/103 |
| 2012/0046854 A1* | 2/2012 | Sangkyu et al. .............. | 701/108 |

FOREIGN PATENT DOCUMENTS

JP 2005-240709 A 9/2005
JP 2009-293383 A 12/2009

* cited by examiner

*Primary Examiner* — Hai Huynh
(74) *Attorney, Agent, or Firm* — Alleman Hall McCoy Russell & Tuttle LLP

(57) ABSTRACT

This disclosure provides a control device for a diesel engine. When the engine is within a particular operating range with a low engine speed and a partial engine load and in a low temperature state where a cylinder temperature at a compression stroke end is lower than a predetermined temperature, a forced induction system sets a forcibly inducting level higher than a predetermined level that is higher than that in a high temperature state where the cylinder temperature is above the predetermined temperature. At least within the particular operating range, an injection control module performs a main injection where a fuel injection starts at or before a top dead center of the compression stroke to cause main combustion mainly including diffusion combustion and performs a pre-stage injection where the fuel injection is performed at least once prior to the main injection to cause pre-stage combustion before the main combustion starts.

20 Claims, 9 Drawing Sheets

METHOD AND DEVICE FOR CONTROLLING DIESEL ENGINE WITH FORCED INDUCTION SYSTEM

BACKGROUND

The present invention relates to a method and device for controlling a diesel engine with a forced induction system.

In diesel engines mounted in automobiles, a plurality of fuel injections are performed within cylinders during one cycle of the engine in order to, for example, reduce NOx and soot contained in exhaust gas, reduce noises or vibrations, and improve a fuel consumption and torque. For example, JP2009-293383A discloses a diesel engine with a turbocharger in which fuel injection is performed at five timings: a main injection for generating a torque, a pilot injection performed prior to the main injection so as to preheat cylinders, a pre-injection performed between the pilot injection and the main injection to suppress an ignition delay of fuel injected by the main injection, an after injection performed after the main injection so as to raise a temperature of exhaust gas, and a post injection for raising a temperature of a catalyst by directly introducing the fuel to an exhaust system subsequently to the after injection.

Further, for example, JP2005-240709A discloses an art in which, in view of increasing temperatures inside cylinders by preliminary combustion prior to main combustion, an injection amount of fuel by a pilot injection is changed according to an engine load and an engine speed. Thereby, the temperatures inside the cylinders are increased at the time of performing a main injection to surely exceed a temperature in which the fuel can self-ignite, and thus, misfire of the fuel injected by the main injection is prevented.

Meanwhile, in a diesel engine where fuel supplied to cylinders self-ignites through compression, a comparatively low compression ratio in which a geometric compression ratio is, for example, 15:1 or lower is set in order to achieve, for example, a reduction of a discharge amount of NOx. The low compression ratio subsides the combustion in each of the cylinders and suppresses generation of NOx. Further, because the lowered compression ratio of the engine reduces a mechanical resistance loss, it is also beneficial in improving a thermal efficiency of the engine.

Generally, in view of improving a fuel consumption and an NVH performance of the diesel engine, main combustion mainly including diffusion combustion is desired to stably be performed near a top dead center of a compression stroke. However, after the injection of the fuel, if an ignition delay until a start of the combustion becomes long, a controllability of the combustion degrades and, therefore, it becomes difficult to, for example, stably perform the main combustion near the top dead center of the compression stroke. The inventors have found that performing a pre-stage injection at least once prior to a main injection to cause pre-stage combustion appropriately before the start of the main combustion shortens the ignition delay comparatively by optimizing cylinder internal temperature and pressure at the start of the main combustion and benefits in improving the controllability of the main combustion, in other words, improves a fuel consumption and an NVH performance.

However, the lowered compression ratio of the engine decreases the temperature and the pressure at the end of the compression stroke when the engine speed and the engine load are low, and therefore, in order to increase the cylinder internal temperature and pressure to improve the controllability of the main combustion, a large amount of fuel needs to be injected by the pre-stage injection. For example, particularly, when the engine is in a non-warmed-up state or an outside air temperature is low where the temperature at the end of the compression stroke decreases, or under a high altitude condition where the temperature and pressure at the end of the compression stroke decrease, the fuel injection amount by the pre-stage injection needs to significantly be increased.

SUMMARY

The present invention is made in view of the above situations, and provides a control device for a diesel engine with a forced induction system, which improves a controllability of main combustion by optimizing states of cylinder internal temperature and pressure at a start of a main injection and reduces a fuel injection amount of a pre-stage injection required to optimize the state inside the cylinder.

According to studies by the inventors of this invention, described in detail below, when isochrone lines are drawn by connecting temperature-pressure states in which an ignition delay of the fuel is constant on a temperature-pressure plane having the cylinder internal temperature and pressure as parameters as shown in FIG. 6 as an example, within areas of the isochrone lines where the cylinder internal pressure is comparatively low (an area on a relatively left side in FIG. 6), the cylinder internal temperature is relatively high (hereinafter, the corresponding part of the isochrone line may be referred to as "the high temperature part") and, on the other hand, within areas of the isochrone lines where the cylinder internal pressure is comparatively high (an area on the relatively right side in FIG. 6), the cylinder internal temperature is comparatively low compared to the relatively high cylinder internal temperature (hereinafter, the corresponding part of the isochrone line may be referred to as "the low temperature part"). Thereby, the inventors have found that the isochrone line as a whole has a two-stage characteristic including the high temperature part and the low temperature part. Here, in the contour chart of FIG. 6, only the two isochrone lines of the solid line and the broken line are drawn, in which the solid isochrone line corresponds to the ignition delay of 0.2 msec and the isochrone line indicated by the broken line corresponds to the ignition delay of 1.5 msec. Note that, the high temperature part of the isochrone line indicated by the broken line exists within a range where the cylinder internal pressure is lower than the cylinder internal pressure range indicated in FIG. 6. In such contour chart, the ignition delay is shorter toward right or above and longer toward left or below. Therefore, when the state of the cylinder internal temperature and pressure is, for example, within a range on the right of or above the solid isochrone line, the ignition delay is the ignition delay indicated by the isochrone line or shorter. Thus, in view of shortening the ignition delay of the fuel injected by the main injection to improve the controllability of the main combustion, the state inside the cylinder at the start of the main injection needs to be within the range on the right of or above the solid isochrone line as indicated by, for example, the white circles with the symbols $C_{10}$ and $C_{11}$ in FIG. 6. The pre-stage injection and pre-stage combustion for improving the controllability of the main combustion corresponds to improving the cylinder internal temperature and pressure so that the state inside the cylinder indicated by the black square with the symbol $C_{00}$ or $C_{01}$ in FIG. 6 becomes the state indicated by the white circle with the symbol $C_{10}$ or $C_{11}$ at the start of the main injection. Thus, the state of the cylinder internal temperature and pressure can be shifted from the range on the left of or below to the range on the right of and above the isochrone line by crossing the solid isochrone line.

Here, an engine with, for example, a low compression ratio in which a geometric compression ratio $\epsilon$ is about 14:1 essentially has low temperature and pressure at the end of the compression stroke. Further, when an operating range of the low compression ratio engine is in a particular operating range, where an engine speed is low and an engine load is partial, and combined with environmental conditions where the temperature at the end of the compression stroke decreases, the state of the cylinder internal temperature and pressure is located within the range on the comparatively left in the contour chart, as indicated by the black square with the symbol $C_{00}$ in FIG. 6. Therefore, by increasing the cylinder internal temperature and pressure by the pre-stage injection and the pre-stage combustion caused thereby, the state of the cylinder internal temperature and pressure needs to be shifted to the state indicated by the white circle with the symbol $C_{10}$ by crossing the high temperature part of the isochrone line as indicated by the dot-dashed line arrow in FIG. 6. However, the length of the arrow in the contour chart corresponds to the fuel injection amount by the pre-stage injection and the injection amount becomes larger as the length of the arrow becomes longer. Therefore, in the engine with low geometric compression ratio, in order to shorten the ignition delay of the fuel by the main injection, the large amount of fuel needs to be injected by the pre-stage injection.

In order to avoid the injection amount to be injected by the pre-stage injection becoming large, the inventors have focused on that, in the contour chart shown in FIG. 6, the isochrone line relating to the ignition delay has the above described two-stage characteristic including the two parts, the high temperature part where the temperature is relatively high and the low temperature part where the temperature is relatively low. That is, as indicated by the white arrow in FIG. 6, by forcibly inducting to particularly increase the pressure at the end of the compression stroke and, thereby, shifting the state inside the cylinder to the range on the relatively right side in the contour chart as indicated by the black square with the symbol $C_{01}$, the state inside the cylinder can cross the low temperature part of the isochrone line by the pre-stage injection and the pre-stage combustion and, thus, the length of the arrow corresponding to the fuel injection amount can significantly be shorter as indicated by the arrow in solid line in FIG. 6. That is, the fuel injection amount by the pre-stage injection required to shorten the ignition delay at the start of the main injection can significantly be reduced.

According to one aspect of the invention, a control device for a diesel engine with a forced induction system is provided, which includes an engine body having a geometric compression ratio of 15:1 or lower and for compressing fuel supplied to a cylinder to cause a self-ignition, a forced induction system for forcibly inducting intake air into the cylinder, a fuel injection valve arranged so as to be oriented toward the cylinder and for directly injecting the fuel into the cylinder, and an injection control module for controlling a mode of injecting the fuel into the cylinder through the fuel injection valve. When the engine body is within a particular operating range where an engine speed is low and an engine load is partial and in a low temperature state in which a cylinder temperature at the end of the compression stroke is lower than a predetermined temperature, a forcibly inducting level by the forced induction system is set higher than a predetermined level that is higher than that in a high temperature state in which the cylinder temperature is above the predetermined temperature. At least within the particular operating range, the injection control module performs a main injection where the fuel injection starts at or before a top dead center of the compression stroke to cause main combustion mainly including diffusion combustion and performs a pre-stage injection where the fuel injection is performed at least once prior to the main injection to cause pre-stage combustion before the main combustion starts.

Here, the phrase "the forced induction system" includes both a mechanically operated compressor (e.g., supercharger) and a compressor operated by an exhaust turbine (i.e., turbocharger), and the mechanically operated compressor includes an electric assist turbo.

Further, the phrase "the particular operating range of the engine body where the engine speed is low and the engine load is partial" indicates an operating range where, conventionally, the forcible induction is substantially not performed because the engine speed is low, and the engine load is partial so that the torque demand, that is, the forcible induction demand, is nearly nonexistent. Specifically, the particular operating range includes, for example, a low engine speed range when the range of the engine speed is divided into three ranges: low, middle and high ranges, within a range where the engine load is on or slightly higher than a road-load line. The phrase "in the low temperature state in which the cylinder temperature at the end of the compression stroke is lower than the predetermined temperature" corresponds to, for example, a case in which the cylinder temperature at the end of the compression stroke is lower than the predetermined temperature because the temperature of the engine body (it may be represented by an engine coolant temperature) and an outside air temperature are lower than a predetermined temperature and a case in which the cylinder temperature at the end of the compression stroke is lower than the predetermined temperature because an altitude is high and an air density is lower than a predetermined value.

Further, the lowest limit of the geometric compression ratio of the engine body may be, for example, 12:1.

In the above configuration, based on knowledge that an isochrone line relating to an ignition delay has a two-stage characteristic, within the operating range where conventionally the forcible induction is not required and substantially not performed and in the low temperature state in which the cylinder temperature at the end of the compression stroke is lower than the predetermined temperature, the predetermined or higher forcibly inducting level is secured to increase a cylinder internal pressure (and temperature) of the low compression ratio engine. This configuration is for, in other words, when the temperature condition between the temperature condition and the pressure condition relating to the ignition delay is disadvantageous, improving an ignitability by performing the forcible induction to give a benefit to the pressure condition.

Thereby, the pre-stage combustion is caused before the start of the main combustion by the pre-stage injection where the fuel injection is performed at least once prior to the main injection, and a cylinder internal temperature-pressure state crosses a low temperature part of the isochrone line to shift from a range on the left of or below to a range on the right of and above the isochrone line. Thus, as above, an injection amount by the pre-stage injection required to cross the isochrone line can be reduced. Therefore, the phrase "the predetermined or higher forcibly inducting level" may be defined, as one kind of the definitions, as a forcibly inducting level with which the state inside the cylinder can be moved, in a contour chart, to near the low temperature part of the isochrone line corresponding to a target ignition delay so as to be able to cross the low temperature part by the pre-stage combustion. That is, the low forcibly inducting level cannot cause the state inside the cylinder to be moved to near the low temperature part of the isochrone line and the state inside the cylinder cannot cross the low temperature part by the pre-stage combustion. The predetermined forcibly inducting level is set according to a relative distance from the state of the cylinder internal temperature and pressure to the isochrone line.

Thus, the state inside the cylinder at the start of the main injection is positioned within the range on the right of or above the isochrone line in association with the pre-stage combustion. Therefore, the ignition delay is shortened to become the desired ignition delay, and the main combustion mainly including the diffusion combustion can stably be performed near the top dead center of the compression stroke. That is, in the low compression ratio engine, improving a controllability of the main combustion benefits in improving a fuel consumption and an NVH performance.

The forced induction system may be a two-stage turbocharger including a first turbocharger having a turbine with a relatively small volume and a second turbocharger having a turbine with a relatively large volume that are arranged in an exhaust passage of the engine body, and, when the engine body is at least within the particular operating range and in the low temperature state, the predetermined or higher forcibly inducting level may be secured by operating the first turbocharger.

Alternatively, the forced induction system may be a variable geometry turbocharger in which movable vanes are provided to a turbine arranged in an exhaust passage of the engine body, and, when the engine body is at least within the particular operating range and in the low temperature state, the predetermined or higher forcibly inducting level may be secured by choking an opening of the vanes to operate the turbocharger.

The two-stage turbocharger and the variable geometry turbocharger have a wide operating range regarding the engine speed, and therefore, by operating the two-stage turbocharger or the variable geometry turbocharger within a low engine speed range, an effect of reducing the injection amount to be injected by the pre-stage injection by the increase of the cylinder internal pressure can be secured. On the other hand, by operating the two-stage turbocharger or the variable geometry turbocharger within a high engine speed range and a high engine load range, an effect of increasing the torque can be secured.

The diesel engine may further include a bypass passage for bypassing the forced induction system and an adjusting valve for adjusting a flow rate in the bypass passage. When the engine body is at least within the particular operating range and in the low temperature state, the predetermined or higher forcibly inducting level may be secured by reducing the flow rate in the bypass passage.

By reducing the flow rate in the bypass passage or stopping the flow in the bypass passage and operating the forced induction system, the predetermined or higher forcibly inducting level can be secured.

The forced induction system may be a variable geometry turbocharger in which movable vanes are provided to a turbine arranged in an exhaust passage of the engine body. The bypass passage may bypass the turbine. When the engine body is at least within the particular operating range and in the low temperature state, the predetermined or higher forcibly inducting level may be secured by reducing the flow rate in the bypass passage and choking an opening of the vanes to operate the forced induction system.

The forced induction system may be a two-stage turbocharger including a first turbocharger having a turbine with a relatively small volume and a second turbocharger having a turbine with a relatively large volume that are arranged in an exhaust passage of the engine body. The bypass passage may bypass the turbine of the first turbocharger. When the engine body is at least within the particular operating range and in the low temperature state, the predetermined or higher forcibly inducting level may be secured by reducing the flow rate in the bypass passage.

The combination of reducing the flow rate in the bypass passage (including stopping the flow) and adopting the variable geometry turbocharger or the two-stage turbochargers can secure the predetermined or higher forcibly inducting level within the particular operating range where the engine speed is low and the engine load is partial when in the low temperature state in which the temperature at the end of the compression stroke is lower than the predetermined temperature.

Here, the pre-stage combustion is important in improving the controllability of the main combustion. If the ignition delay of the fuel injected by the pre-stage injection is long, a controllability of the pre-stage combustion degrades, and therefore, the pre-stage combustion is difficult to sufficiently occur before the main injection. As a result, the cylinder internal temperature and pressure at the start of the main injection is not sufficiently increased, and the controllability of the main combustion may degrade.

Meanwhile, the factors for determining the ignition delay are not only the cylinder internal temperature and pressure, an equivalence ratio is also one of the factors. Generally, the ignition delay becomes shorter as the equivalence ratio becomes higher and the ignition delay becomes longer as the equivalence ratio becomes lower. For example, when the total injection amount by the pre-stage injection is supplied by a single fuel injection, an injection time period is extended, and therefore the injected fuel is dispersed at once to cause the cylinder internal state to be over lean. Thereby, the (local) equivalence ratio is reduced and the ignition delay for the pre-stage combustion becomes longer.

Thus, in view of improving the controllability of the pre-stage combustion by shortening the ignition delay for the pre-stage combustion, when the engine body is at least within the particular operating range, the injection control module may perform a plurality of injections as the pre-stage injection at timings in which the fuel injected by each of the injections reaches within a cavity formed in a top surface of a piston fitted in the cylinder.

By performing the plurality of fuel injections as the pre-stage injection, the injection amount per injection is reduced and the fuel is not dispersed at once. The injected fuel is not dispersed and floats in the proximity and the newly injected fuel reaches the previously injected fuel, and the fuels concentrate as one. Thereby, mixture gas with a locally high equivalence ratio is formed. As a result, the ignition delay of the fuel injected by the pre-stage injection is shortened, the controllability of the pre-stage combustion is improved, and the main combustion can stably be performed near the top dead center of the compression stroke.

Further, in the above configuration, by performing the pre-stage injection so that the fuel injected by the plurality of injections reaches within the cavity formed in the top surface of the piston, the fuel is suppressed from dispersing outside the cavity and the mixture gas with a high equivalence ratio can be formed within the cavity. Thereby, the controllability of the pre-stage combustion is further improved and it is beneficial in further stably performing the pre-stage combustion. Here, the phrase "the fuel reaches within the cavity" includes both a case where the fuel injected by the fuel injection valve reaches directly within the cavity while the piston elevates toward the top dead center of the compression stroke, and a case where the fuel injected by the fuel injection valve reaches, for example, a lip part of the cavity and flows outside the cavity but then flows into the cavity due to the piston moving to near the top dead center of the compression stroke. That is, an advance limit of the pre-stage injection is correspondingly extended.

On a temperature-pressure plane having cylinder internal temperature and pressure as parameters, the engine body may have a two-stage characteristic including a high temperature part and a low temperature part, in which the cylinder internal temperature is relatively high when an isochrone line drawn by connecting temperature-pressure states in which an ignition delay of the fuel injected into the cylinder through the fuel injection valve is constant is within an area where the cylinder internal pressure is comparatively low and, on the other hand, the cylinder internal temperature is relatively low when the isochrone line is within an area where the cylinder internal pressure is comparatively high. The pre-stage injection may increase at least the cylinder internal temperature associated with the occurrence of the pre-stage combustion to obtain the cylinder internal temperature-pressure state at the start of the main injection so that the ignition delay is shorter than a predetermined ignition delay value, and the pre-stage combustion may correspond to crossing the isochrone line corresponding to the predetermined ignition delay on the temperature-pressure plane. When the engine body is within the particular operating range and in the low temperature state, a predetermined or higher forcibly inducting level may be secured by the forced induction system to increase at least the cylinder internal pressure so that the cylinder internal pressure-temperature state before the pre-stage combustion is positioned to near the low temperature part of the isochrone line with the two-stage characteristic and, thereby, may cross the low temperature part of the isochrone line by utilizing the pre-stage combustion.

As described above, when the engine body is within the particular operating range and in the low temperature state, a predetermined or higher forcibly inducting level may be secured by the forced induction system to increase at least the cylinder internal pressure so that the cylinder internal pressure-temperature state before the pre-stage combustion is positioned near the low temperature part of the isochrone line with the two-stage characteristic and, thereby, can cross the low temperature part of the isochrone line by utilizing the pre-stage combustion. As a result, by shortening the ignition delay of the fuel injected by the main injection while reducing the fuel injection amount to be injected by the pre-stage injection as much as possible, the controllability of the main combustion is improved.

The injection control module may control injection modes of the pre-stage injection and the main injection so that a heat release rate of the pre-combustion reaches a peak, the heat release rate starts to decrease, and then, a heat release rate of the main combustion starts to increase.

In the above configuration, on a chart indicating a change of the heat release rate relative to a change of a crank angle, a minimum value exists between a relatively low bell curve of the pre-stage combustion and a relatively high bell curve of the main combustion. That is, a bell curve peak of the heat release rate of the pre-stage combustion is generated before the heat release rate of the main combustion starts to increase. Therefore, by using the energy obtained from the pre-stage combustion, the cylinder internal temperature and pressure are increased enough to shorten the ignition delay by the time the main combustion starts while avoiding an increase of a combustion sound of the main combustion. Thus, the injection amount by the pre-stage injection is reduced to the minimum necessary in addition to the ignition delay being shortened, and thereby, it is beneficial in improving the fuel consumption.

The injection control module may control injection modes of the pre-stage injection and the main injection so that the ignition delay from the start of the main injection to the start of the main combustion is 0.1 to 0.3 msec by the pre-stage combustion increasing the cylinder internal temperature and pressure.

The ignition delay for the main combustion longer than 0.3 msec generates a steep slope of the heat release rate of the main combustion and degrades the NVH performance. On the other hand, the ignition delay for the main combustion shorter than 0.1 msec shortens the ignition delay too much and, therefore, a robustness of the control degrades.

According to another aspect of the invention, a method of controlling a diesel engine with a forced induction system, the diesel engine having a geometric compression ratio is set to 15:1 or lower and compressing fuel supplied to a cylinder to cause a self-ignition.

The controlling method includes controlling, when the diesel engine is within a particular operating range where an engine speed is low and an engine load is partial and in a low temperature state in which a cylinder temperature at the end of the compression stroke is lower than a predetermined temperature, a forcibly inducting level by the forced induction system to be higher than a predetermined level that is higher than that in a high temperature state in which the cylinder temperature is above the predetermined temperature. The method also includes performing, at least within the particular operating range, a pre-stage injection where a fuel injection is performed at least once at a predetermined timing to cause pre-stage combustion before main combustion mainly including diffusion combustion starts. The method also includes starting, after the pre-stage injection, a main injection for causing the main combustion at or before a top dead center of the compression stroke.

BRIEF DESCRIPTION OF THE DRAWINGS

FIGS. 9A to 9C show distribution frequencies of local equivalence ratios within the cylinders with injection modes different from each other, in which FIG. 9A is in the injection mode where the number of injection holes is eight and an injection is performed once, FIG. 9B is in the injection mode where the number of the injection holes is eight and the injection is performed three times, and FIG. 9C is in the injection mode where the number of the injection holes is twelve and the injection is performed three times.

DESCRIPTION OF EMBODIMENT

Figure 1:
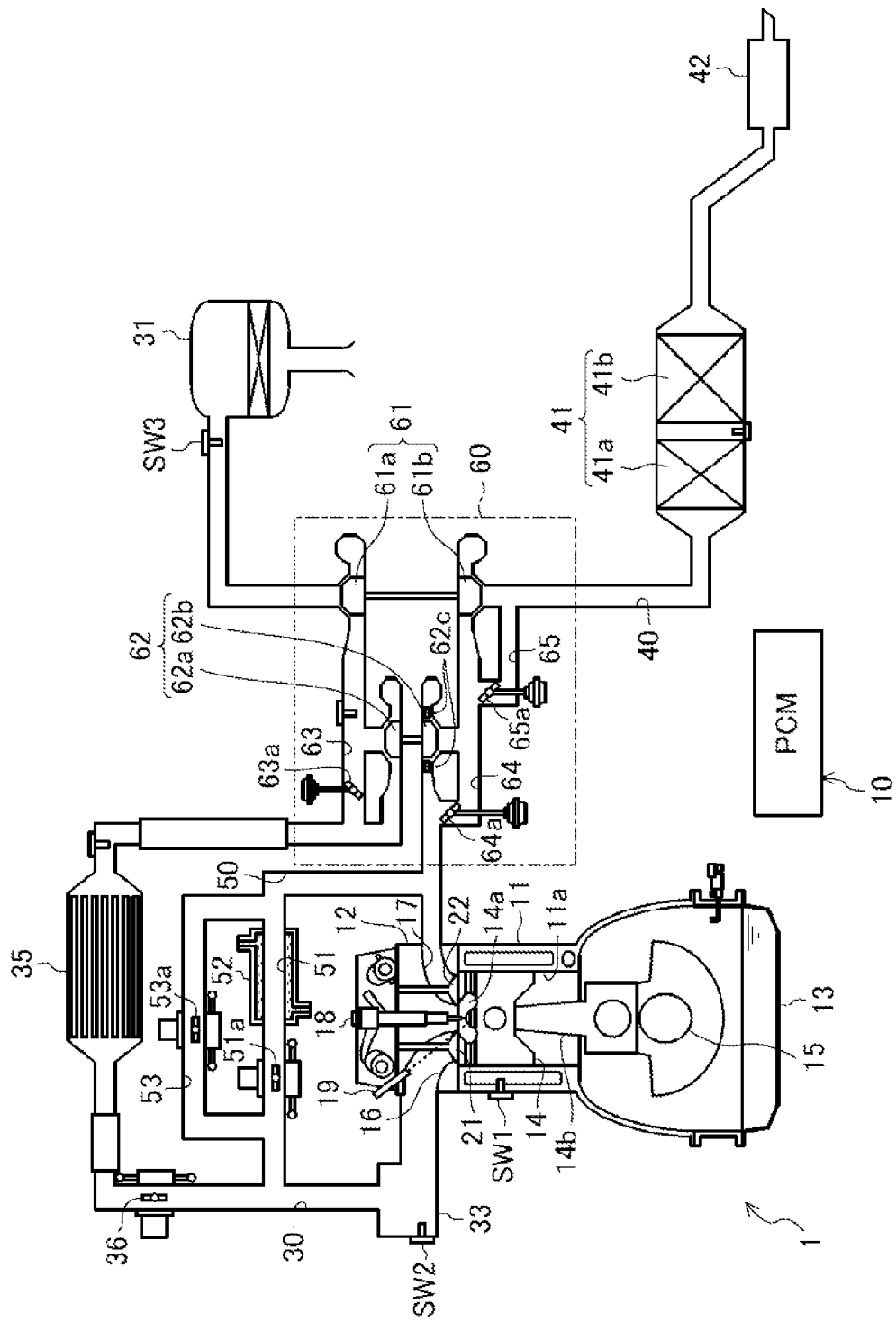
FIG. 1 is a schematic diagram showing a configuration of a diesel engine with a forced induction system according to an embodiment.
Figure 2:
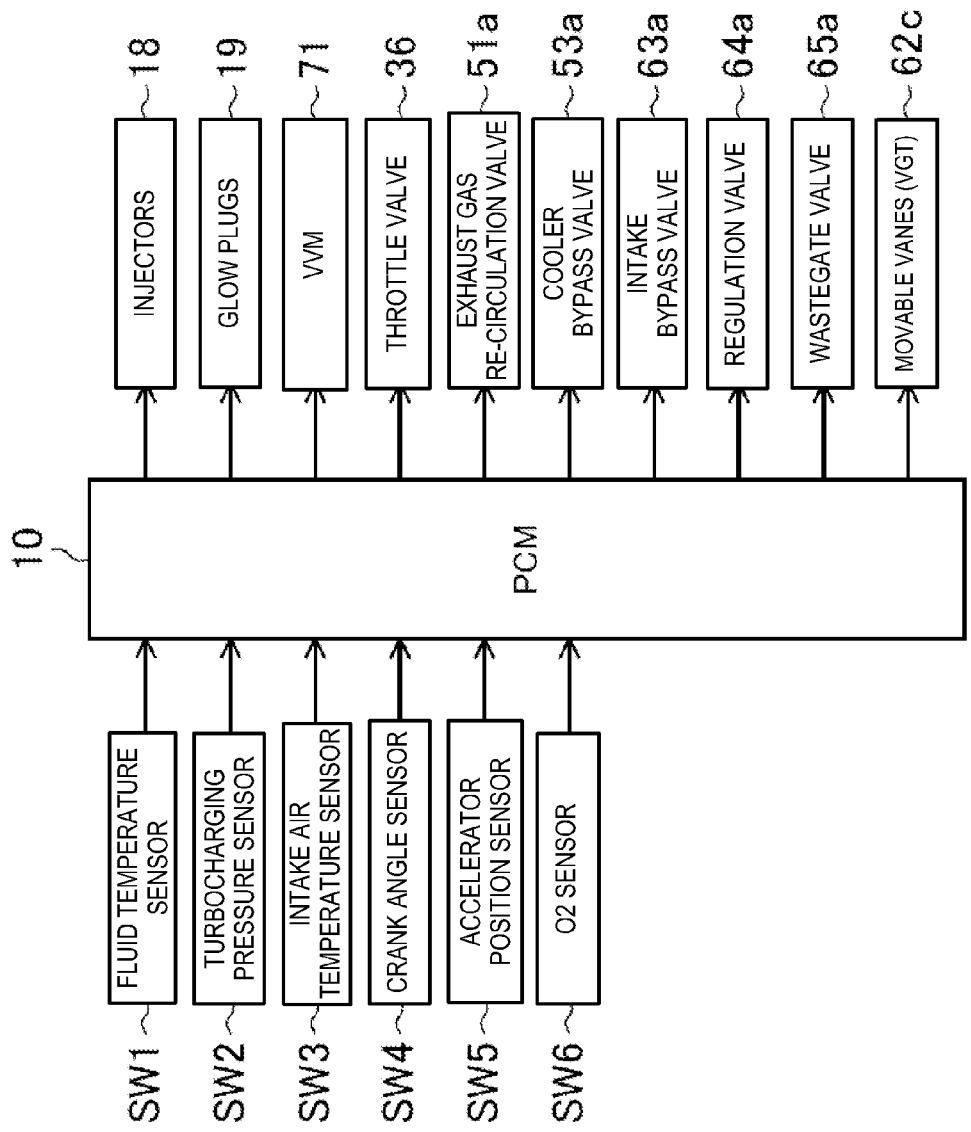
FIG. 2 is a block diagram relating to a control of the diesel engine.

Hereinafter, a diesel engine according to an embodiment of the present invention is described in detail with reference to the appended drawings. Note that, the following description of the preferred embodiment is merely an illustration. FIGS. 1 and 2 show schematic configurations of an engine (engine body) 1 of the embodiment. The engine 1 is a diesel engine that is mounted in a vehicle and supplied with fuel in which a main component is diesel fuel. The diesel engine includes a cylinder block 11 provided with a plurality of cylinders 11a (only one cylinder is illustrated), a cylinder head 12 arranged on the cylinder block 11, and an oil pan 13 arranged below the cylinder block 11 where a lubricant is stored. Inside the cylinders 11a of the engine 1, pistons 14 are reciprocatably fitted, and cavities partially forming reentrant combustion chambers 14a are formed in top surfaces of the pistons 14, respectively. Each of the pistons 14 is coupled to a crank shaft 15 via a connecting rod 14b.

In the cylinder head 12, an intake port 16 and an exhaust port 17 are formed and an intake valve 21 for opening and closing the opening of the intake port 16 on the combustion chamber 14a side and an exhaust valve 22 for opening and closing the opening of the exhaust port 17 on the combustion chamber 14a side are arranged for each of the cylinders 11a.

Within a valve system of the engine 1 for operating the intake and exhaust valves 21 and 22, a hydraulically-actuated switching mechanism 71 (see FIG. 2, hereinafter, it is referred to as VVM, variable valve motion) for switching an operation mode of the exhaust valves 22 between a normal mode and a special mode is provided on the exhaust valve side. The VVM 71 (a detailed configuration is not illustrated) includes two kinds of cams with cam profiles different from each other, that is a first cam having one cam nose and a second cam having two cam noses, and a lost motion mechanism for selectively transmitting an operating state of either one of the first and second cams to the exhaust valves 22. When the lost motion mechanism transmits the operating state of the first cam to the exhaust valves 22, the exhaust valves 22 operate in the normal mode and open only once during an exhaust stroke. On the other hand, when the lost motion mechanism transmits the operating state of the second cam to the exhaust valves 22, the exhaust valves 22 operate in the special mode and open during the exhaust stroke and further during an intake stroke once each, that is the exhaust valves are opened twice.

The mode switching in the VVM 71 between the normal and special modes is performed by a hydraulic pressure applied by a hydraulic pump (not illustrated) operated by the engine. The special mode may be utilized for a control related to an internal EGR. Note that, an electromagnetically-operated valve system for operating the exhaust valve 22 by using an electromagnetic actuator may be adopted for switching between the normal and special modes. Further, the execution of the internal EGR is not limited to opening the exhaust valves 22 twice, and it may be accomplished through an internal EGR control by opening the intake valves 21 twice or through an internal EGR control where the burnt gas remains in the combustion chambers by setting a negative overlap period through closing both of the intake and exhaust valves 21 and 22 during the exhaust stroke or the intake stroke. Note that, the internal EGR control is controlled by the VVM 71 mainly under a cold state of the engine 1 where an ignitability of the fuel is low.

Injectors 18 for injecting the fuel and glow plugs 19 for improving an ignitability of the fuel by heating intake air inside the cylinders 11a when the engine 1 is in a cold state are provided within the cylinder head 12. The injectors 18 are arranged so that fuel injection ports thereof face the combustion chambers 14a from ceiling surfaces of the combustion chambers 14a, respectively, and the injectors 18 supply the fuel to the combustion chambers 14a by directly injecting the fuel mainly near a top dead center (TDC) of a compression stroke.

An intake passage 30 is connected to a side surface of the engine 1 so as to communicate with the intake ports 16 of the cylinders 11a. Meanwhile, an exhaust passage 40 for discharging the burnt gas (i.e., exhaust gas) from the combustion chambers 14a of the cylinders 11a is connected to the other side surface of the engine 1. A large turbocharger 61 and a compact turbocharger 62 for turbocharging the intake air (described in detail below) are arranged in the intake and exhaust passages 30 and 40.

An air cleaner 31 for filtrating the intake air is arranged in an upstream end part of the intake passage 30. A surge tank 33 is arranged near a downstream end of the intake passage 30. A part of the intake passage 30 on the downstream side of the surge tank 33 is branched to include independent passages extending toward the respective cylinders 11a, and downstream ends of the independent passages are connected with the intake ports 16 of the cylinders 11a.

A compressor 61a of the large turbocharger 61, a compressor 62a of the compact turbocharger 62, an intercooler 35 for cooling air compressed by the compressors 61a and 62a, and a throttle valve 36 for adjusting an amount of the intake air flowing into the combustion chambers 14a of the cylinders 11a are arranged in the intake passage 30 between the air cleaner 31 and the surge tank 33. The throttle valve 36 is basically fully opened; however, it is fully closed when the engine 1 is stopped so as to prevent a shock.

A part of the exhaust passage 40 on the upstream side is constituted with an exhaust manifold having independent passages branched toward the cylinders 11a and connected with outer ends of the exhaust ports 17 and a merging part where the independent passages merge together.

In a part of the exhaust passage 40 downstream of the exhaust manifold, a turbine 62b of the compact turbocharger 62, a turbine 61b of the large turbocharger 61, an exhaust emission control device 41 for purifying hazardous components contained in the exhaust gas, and a silencer 42 are arranged in this order from the upstream.

The exhaust emission control device 41 includes an oxidation catalyst 41a and a diesel particulate filter 41b (hereinafter, referred to as the filter), and these components are arranged in this order from the upstream. The oxidation catalyst 41a and the filter 41b are accommodated in a case. The oxidation catalyst 41a has an oxidation catalyst carrying, for example, platinum or platinum with added palladium and promotes a reaction generating $CO_2$ and $H_2O$ by oxidizing CO and HC contained in the exhaust gas. The filter 41b catches particulates such as soot contained in the exhaust gas from the engine 1. Note that the filter 41b may be coated with the oxidation catalyst.

A part of the intake passage 30 between the surge tank 33 and the throttle valve 36 (i.e., a part downstream of the compact compressor 62a of the compact turbocharger 62) and a part of the exhaust passage 40 between the exhaust manifold and the compact turbine 62b of the compact turbocharger 62 (i.e., a part upstream of the compact turbine 62b of the compact turbocharger 62) are connected with an exhaust gas re-circulation passage 50 for partially re-circulating the exhaust gas to the intake passage 30. The exhaust gas re-circulation passage 50 includes a main passage 51 arranged with an exhaust gas re-circulation valve 51a for adjusting a re-circulation amount of the exhaust gas to the intake passage 30 and an EGR cooler 52 for cooling the exhaust gas by an engine coolant, and a cooler bypass passage 53 for bypassing the EGR cooler 52. A cooler bypass valve 53a for adjusting the flow rate of the exhaust gas flowing through the cooler bypass passage 53 is arranged in the cooler bypass passage 53.

The large turbocharger 61 has the large compressor 61a arranged in the intake passage 30 and the large turbine 61b arranged in the exhaust passage 40. The large compressor 61a is arranged in the intake passage 30 between the air cleaner 31 and the intercooler 35. The large turbine 61b is arranged in the exhaust passage 40 between the exhaust manifold and the oxidation catalyst 41a.

The compact turbocharger 62 has the compact compressor 62a arranged in the intake passage 30 and the compact turbine 62b arranged in the exhaust passage 40. The compact compressor 62a is arranged in the intake passage 30 downstream of the large compressor 61a. The compact turbine 62b is arranged in the exhaust passage 40 upstream of the large turbine 61b.

That is, the large compressor 61a and the compact compressor 62a are arranged in series in the intake passage 30 in this order from the upstream, and the compact turbine 62b and the large turbine 61b are arranged in series in the exhaust passage 40 in this order from the upstream. The large and compact turbines 61b and 62b are rotated by the flow of the exhaust gas, and the large and compact compressors 61a and 62a coupled with the large and compact turbines 61b and 62b are actuated by the rotations of the large and compact turbines 61b and 62b, respectively.

The compact turbocharger 62 is smaller and the large turbocharger 61 is larger in relation to each other. That is, inertia of the large turbine 61b of the large turbocharger 61 is larger than that of the compact turbine 62b of the compact turbocharger 62.

Here, the compact turbocharger 62 is a variable geometry turbocharger (VGT) that can adjust the flow velocity of the exhaust gas flowing into the compact turbine 62b according to the operating state of the engine 1, and movable vanes 62c for the adjustment of the incoming flow of the exhaust gas are arranged at an inlet of the compact turbine 62b. A detailed illustration of the VGT is omitted because the configuration thereof is commonly known. The exhaust gas passes through nozzle flow passages each formed between the movable vanes 62c and flows into rows of turbine blades, and the opening amounts of the nozzle flow passages (i.e., opening angles of the vanes) are changed by turns of the movable vanes 62c supported to be turnable about their supporting shafts. Throttling down the opening amounts of the nozzle flow passages, particularly when the rotation speed of the engine 1 is low, increases the flow velocity of the exhaust gas flowing into the turbine and, when the flowing direction is tangential to the turbine 62b (i.e., the circumferential direction of the turbine 62b), improves a turbocharging efficiency. Note that, in this case, because an exhaust pressure upstream of the compact turbine 62b increases, exhaust resistance increases.

On the other hand, increasing the opening amount of the nozzle flow passages, particularly when the rotation speed of the engine 1 is high, secures a high flow rate and improves the turbocharging efficiency. Further, the exhaust pressure upstream of the turbine 62b decreases and the exhaust resistance decreases.

A small intake bypass passage 63 for bypassing the small compressor 62a is connected with the intake passage 30. A small intake bypass valve 63a for adjusting an amount of the air flowing into the small intake bypass passage 63 is arranged in the small intake bypass passage 63. The small intake bypass valve 63a is fully closed (i.e., normally closed) when no electric power is distributed thereto.

A small exhaust bypass passage 64 for bypassing the small turbine 62b and a large exhaust bypass passage 65 for bypassing the large turbine 61b are connected with the exhaust passage 40. A regulation valve 64a for adjusting an amount of the exhaust gas flowing to the small exhaust bypass passage 64 is arranged in the small exhaust bypass passage 64, and a wastegate valve 65a for adjusting an exhaust gas amount flowing to the large exhaust bypass passage 65 is arranged in the large exhaust bypass passage 65. The regulation valve 64a and the wastegate 65a are both fully opened (i.e., normally opened) when no electric power is distributed thereto.

The large and compact turbochargers 61 and 62 and the parts of the intake and exhaust passages 30 and 40 where the turbochargers are arranged are integrally unitized to configure a turbocharger unit 60. The turbocharger unit 60 is attached to the engine 1.

The diesel engine 1 with the configuration described as above is controlled by a powertrain control module 10 (hereinafter, may be referred to as PCM). The PCM 10 is configured by a CPU, a memory, a counter timer group, an interface, and a microprocessor with paths for connecting these units. The PCM 10 configures a control device. As shown in FIG. 2, the PCM 10 is inputted with detection signals from a fluid temperature sensor SW1 for detecting a temperature of the engine coolant, a turbocharging pressure sensor SW2 attached to the surge tank 33 and for detecting a pressure on the air to be supplied to the combustion chambers 14a, an intake air temperature sensor SW3 for detecting a temperature of the intake air, a crank angle sensor SW4 for detecting a rotational angle of the crank shaft 15, an accelerator position sensor SW5 for detecting an accelerator opening amount corresponding to an angle of an acceleration pedal (not illustrated) of the vehicle, and an $O_2$ sensor SW6 for detecting an oxygen concentration within the exhaust gas. The PCM 10 performs various kinds of calculations based on the detection signals so as to determine the states of the engine 1 and the vehicle, and further outputs control signals to the injectors 18, the glow plugs 19, the VVM 71 of the valve system, and the actuators of the valves 36, 51a and 53a according to the determined states.

Further, the PCM 10 controls the operations of the large and compact turbochargers 61 and 62 according to the operating state of the engine. Specifically, the PCM 10 controls the opening amounts of the compact intake bypass valve 63a, the regulation valve 64a, and the wastegate valve 65a to be the values which are set according to the operating state of the engine 1. That is, when the engine 1 is in a warmed-up state, within a predetermined operating range where the engine speed and the engine load are low, the PCM 10 controls the opening amounts of the compact intake bypass valve 63a and the regulation valve 64a to be other than in the fully opened state and the wastegate valve 65a to be in a fully closed state, and thereby, both the large and compact turbochargers 61 and 62 are operated. On the other hand, within a predetermined operating range where the engine speed and load are high, because the compact turbocharger 62 creates the exhaust resistance, the PCM 10 controls the opening amounts of the compact intake bypass valve 63a and the regulation valve 64a to be in the fully opened state and the wastegate valve 65a to be close to a fully closed state so as to bypass the compact turbocharger 62, and thereby, only the large turbocharger 61 is operated. Note that, the wastegate valve 65a is set to open a little to prevent an over rotation of the large turbocharger 61.

The PCM 10 changes the opening amount of the movable vanes 62c of the compact turbocharger (VGT) 62 through an actuator (not illustrated) according to the operating state of the engine 1.

Thus, the engine 1 is configured to have a comparatively low compression ratio in which its geometric compression ratio is within a range of 12:1 to below 15:1 (e.g., 14:1), and thereby, the exhaust emission performance and a thermal efficiency are improved. Due to the lowered compression ratio of the engine 1, when the engine 1 is in a non-warmed-up state, within the predetermined operating range (specifically, the range where the engine speed is low and the engine load is partial), the PCM 10 fully closes the compact intake bypass valve 63a and the regulation valve 64a, sets the throttling amount of the movable vanes 62c to be large, and, thereby, actuates the compact turbocharger 62 to secure a predetermined or higher level of turbocharging (described in detail below).

(Description of Combustion Control of the Engine)

In the basic control of the engine 1 by the PCM 10, a target torque (i.e., target engine load) is determined mainly based on the accelerator opening amount, and an injection amount and an injection timing of the fuel corresponding to the target torque is realized by controlling the actuations of the injectors 18. The target torque is set larger as the accelerator opening amount becomes larger or the engine speed becomes higher. The injection amount of the fuel is set based on the target torque and the engine speed. The injection amount is set larger as the target torque becomes larger or the engine speed becomes higher. Further, a re-circulation ratio of the exhaust gas to the cylinders 11a is controlled by controlling the opening angles of the throttle valve 36 and the exhaust gas re-circulation valve 51a (i.e., external EGR control) and controlling the VVM 71 (i.e., internal EGR control).

Figures 3A, 3B:
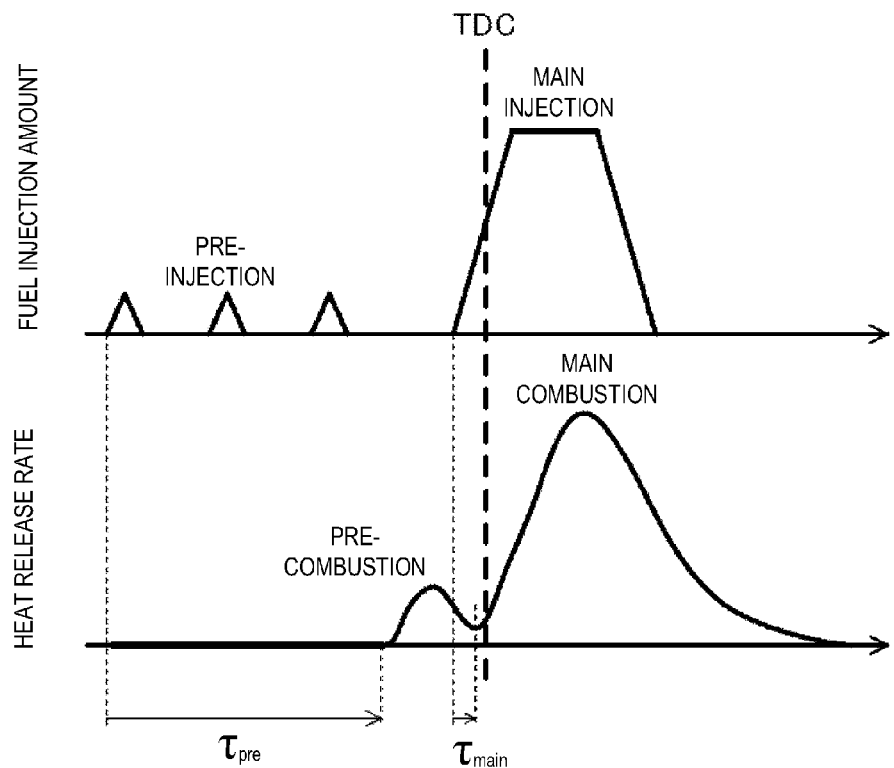
FIG. 3 is charts in which a part (a) is a chart showing an example of a fuel injection mode within a predetermined operating range and a part (b) is a chart showing an example of a history of a heat release rate in cylinders corresponding to the fuel injection mode.

In FIG. 3, the part (a) is a chart showing a fuel injection mode of the engine 1 in a non-warmed-up state and the part (b) is a chart showing an example of a history of a heat release rate in the cylinders 11a corresponding to the fuel injection mode. The PCM 10 determines whether the engine 1 is in the warmed-up state or the non-warmed-up state based on the detection result by the liquid temperature sensor SW1. Specifically, the PCM 10 determines that the engine 1 is in the warmed-up state when the engine coolant temperature is a predetermined temperature (e.g., 80° C.) or above. The PCM 10 determines that the engine 1 is in the non-warmed-up state when the engine coolant temperature is below the predetermined temperature. Further, when the engine 1 is in the non-warmed-up state, the PCM 10 performs a pre-injection (pre-stage injection) three times at timings comparatively close to the TDC of the compression stroke with comparatively short time intervals and further performs a main injection once near the TDC of the compression stroke as shown in FIG. 3. That is, a total of four fuel injections are performed. The three pre-injections are performed to cause the pre-combustion (corresponding to pre-stage combustion) with a sufficient heat release rate so that a peak of the heat release rate is generated at a predetermined timing before the TDC of the compression stroke. In other words, the pre-combustion is performed before a start of main combustion to increase the cylinder internal temperature and pressure at the start of the main injection. Thereby, an ignition delay $\tau_{main}$ of the fuel injected by the main injection is shortened. Therefore, although the main injection starts at a predetermined timing before the TDC of the compression stroke as indicated by the part (a) in FIG. 3 or at the TDC of the compression stroke, due to the short ignition delay $\tau_{main}$, the main combustion caused by the main injection starts at or near the TDC of the compression stroke, which is beneficial in improving the thermal efficiency and, as a result, improving the fuel consumption. Here, in an example shown in the part (b) of FIG. 3, the ignition delay $\tau_{main}$ for the main combustion is defined to be from when the main injection starts to when a heat release rate of the main combustion starts to increase. Further here, injection modes of the pre-injections and the main injection are set so that a heat release rate of the pre-combustion reaches a peak, the heat release rate starts to decrease, and then, a heat release rate of the main combustion starts to increase, and a minimum value of the heat release rates exists between the bell curves of the pre-combustion and the main combustion. The ignition delay $\tau_{main}$ for the main combustion may be defined as a range from the start of the main injection to the point of the minimum value.

The above combustion reduces the increase of the heat release rate of the main combustion and, thus, benefits in reducing a combustion noise to improve an NVH performance. That is, the pre-injection and the pre-combustion caused thereby increase a controllability of the main combustion, generate the main combustion at a desired timing, and thereby, benefit in improving the fuel consumption and the NVH performance.

Further, the bell curve peak of the heat release rate of the pre-combustion is generated before the heat release rate of the main combustion starts to increase. Therefore, by using the energy obtained from the pre-combustion, the cylinder internal temperature and pressure are increased enough to shorten the ignition delay at the time the main combustion starts while avoiding an increase of the combustion sound by the main combustion. Thus, the injection amount by the pre-injections is reduced to the minimum necessary in addition to the ignition delay being shortened, and thereby, it is beneficial in improving the fuel consumption.

Here, performing the pre-injections by dividing the injection amount into three is beneficial in improving the controllability of the pre-combustion. That is, a total injection amount by the pre-injections is determined based on an amount of heat desired to be generated by the pre-combustion, in other words, as described in detail below, an amount of heat required to obtain the desired cylinder internal temperature and pressure at the start of the main injection. If the thus determined total injection amount is supplied to the cylinders 11a by a single pre-injection, the fuel disperses widely within the cylinders and an (local) equivalence ratio of mixture gas is lowered because the comparatively large amount of fuel is injected continuously for a long period. The decrease of the equivalence ratio extends an ignition delay $\tau_{pre}$ for the pre-combustion. On the other hand, injecting the required total injection amount by performing the plurality of pre-injections reduces the injection amount per single pre-injection and, thereby, suppresses the fuel from dispersing. Therefore, the injected fuel reaches and is contained in the mixture gas, which is locally enriched by the prior injection of fuel floating in the proximity due to the suppressed dispersion of itself, and, thus, the mixture gas with a high local (e.g., equivalence ratio of 2:1 to 3:1) can be formed. Thus, the ignition delay $\tau_{pre}$ for the pre-combustion is shortened and, thereby, the timing of performing the pre-combustion can accurately be controlled. That is, as described above, the peak of the heat release rate of the pre-combustion can accurately be generated at the predetermined timing before the TDC of the compression stroke. This leads to stably generating the main combustion at the desired timing and benefits in reducing the combustion noise of the main combustion.

Figure 9C:
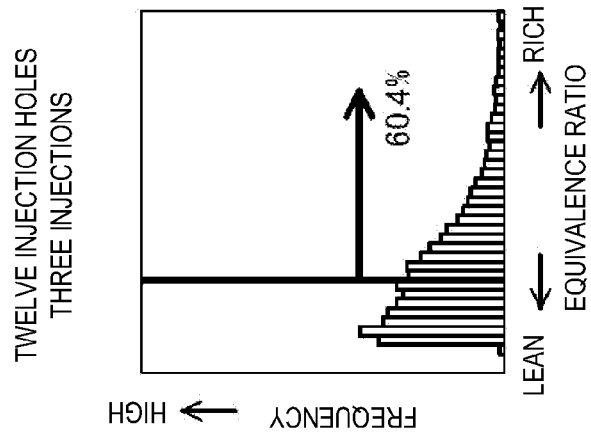
Figure 9B:
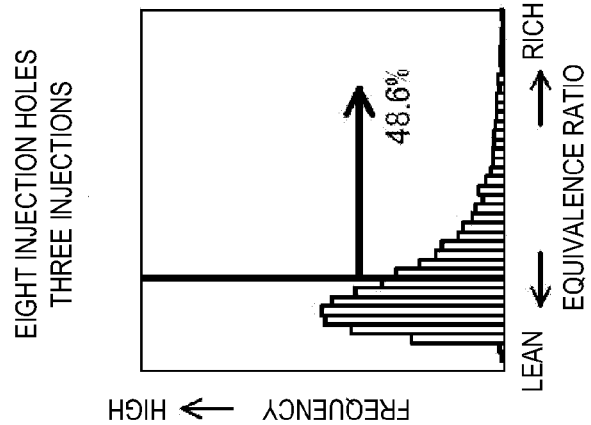
Figure 9A:
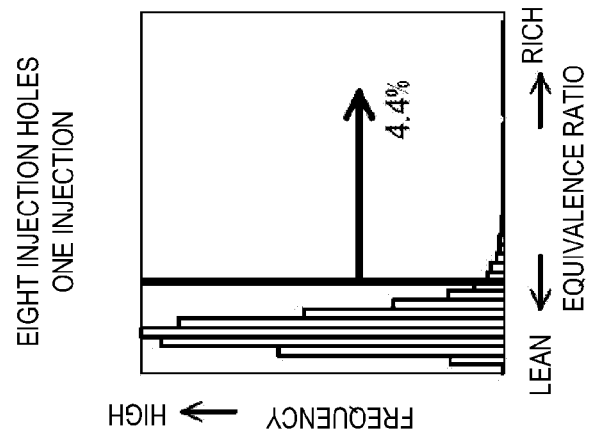

FIGS. 9A to 9C show distribution frequencies of the local equivalence ratios within the cylinders 11a with injection modes different from each other. FIG. 9A shows the distribution frequency of the local equivalence ratio when the number of the total injection holes of the injectors 18 is eight and the injection is performed only once. The frequency of the local equivalence ratio ø being 1:1 or higher is low at 4.4%. In this case, the quality of the ignitability is low and the ignition delay is long. Further, for obtaining the desired heat amount, the fuel injection amount is required to be increased because of the low ignitability.

FIG. 9B shows the distribution frequency of the local equivalence ratio when the injection is performed three times by the eight injection holes. The frequency of the local equivalence ratio ø being 1:1 or higher is 48.6%, and the ignitability is improved by increasing the number of the injections.

FIG. 9C shows the distribution frequency of the local equivalence ratio when the number of the total injection holes of the injectors 18 is increased to twelve and the injection is performed three times. In this case, the frequency of the local equivalence ratio ø being 1:1 or higher is 60.4% and, thereby, the ignitability is unproved also by increasing the injection holes.

Thereby, an increase in the number of the injections is further advantageous in view of increasing the local equivalence ratio by the pre-injection so as to improve the controllability of the pre-combustion; however, it is expected that if the number of the pre-injections is too large, enough time intervals between the injections cannot be obtained and the equivalence ratio does not sufficiently increase. Therefore, the number of the pre-injections is preferably about three at a maximum. Note that, under a condition that is beneficial in improving the ignitability, for example increasing the engine load, the number of the pre-injections may be reduced. Further, an increase in the number of the injection holes of the injectors 18 is further advantageous in view of increasing the local equivalence ratio by the pre-injection so as to improve the controllability of the pre-combustion; however, because the reaching distance of the injection becomes shorter as the number of the injection holes becomes larger due to the smaller diameter of each of the holes, the number of the injection holes of the injectors is preferably between eight to twelve.

In each of the cylinders, the three pre-injections are performed at timings in which all of the fuel injected by each pre-injection reaches within the cavity, that is within the combustion chamber 14a. The timings include the timing where the fuel injected by the injector 18 reaches directly within the cavity while the piston 14 elevates toward the TDC of the compression stroke, and the timing where the fuel injected by the injector 18 reaches, for example, a lip part of the cavity and flows outside the cavity but then flows into the cavity by the time when the piston 14 reaches near the TDC of the compression stroke. Thereby, because the mixture gas with a high equivalence ratio is formed within the cavity, the ignition delay $\tau_{pre}$ for the pre-combustion is further shortened and, therefore, the controllability of the pre-combustion is further improved.

Note that, such combustion control may be performed under a condition where the outside air temperature is 0° C. or lower and/or a condition where an altitude is 1,000 m or higher in which the ignitability within the cylinder 11a decreases, in addition/alternative to a condition where the engine 1 is in the non-warmed-up state. The outside air temperature can be detected by an outside air temperature sensor and the altitude can be detected by an altitude sensor. In other words, the combustion control may be performed under a condition where the temperature at the end of the compression stroke is lower than a predetermined temperature (hereinafter, it may be referred to as the low temperature state).

Further, in this diesel engine 1 where the pre-injections and the main injection are performed, due to the cylinder internal temperature and pressure at the end of the compression stroke becoming low because the compression ratio is low and the engine is in the low temperature state, a problem arises that a large amount of fuel needs to be injected by the pre-injections. Therefore, in order to solve the problem, the fuel injection amount by the pre-injections is reduced by utilizing the turbocharging to increase the cylinder internal pressure (and temperature) in the control device of the diesel engine 1. Hereinafter, the reduction of the fuel injection amount is described in detail with reference to the drawings.

Figure 4A:
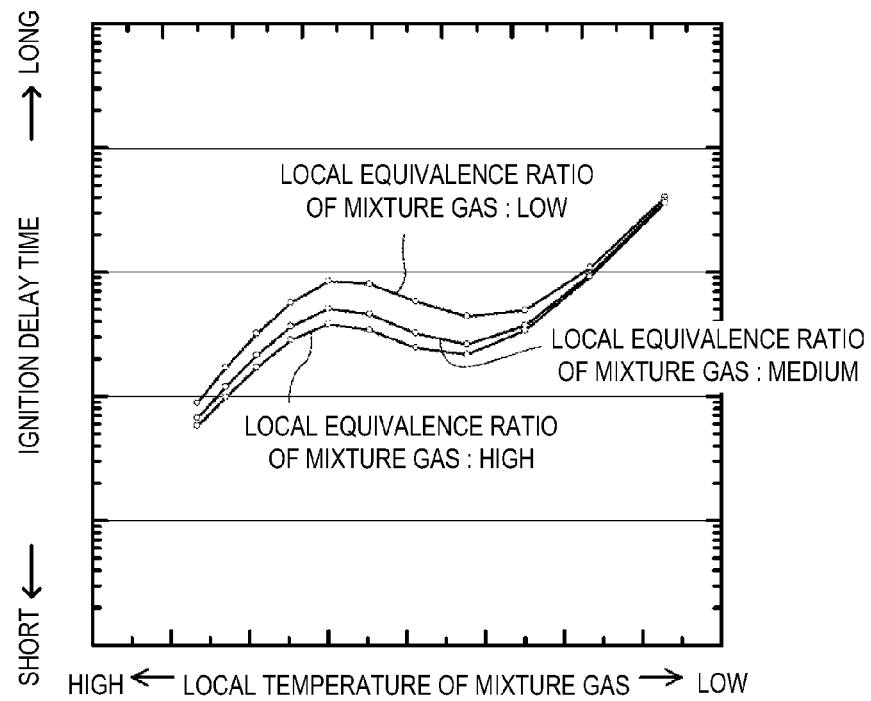
FIG. 4A is a chart showing an example of a relation of an ignition delay relative to a local temperature when a local equivalence ratio is changed.
Figure 4B:
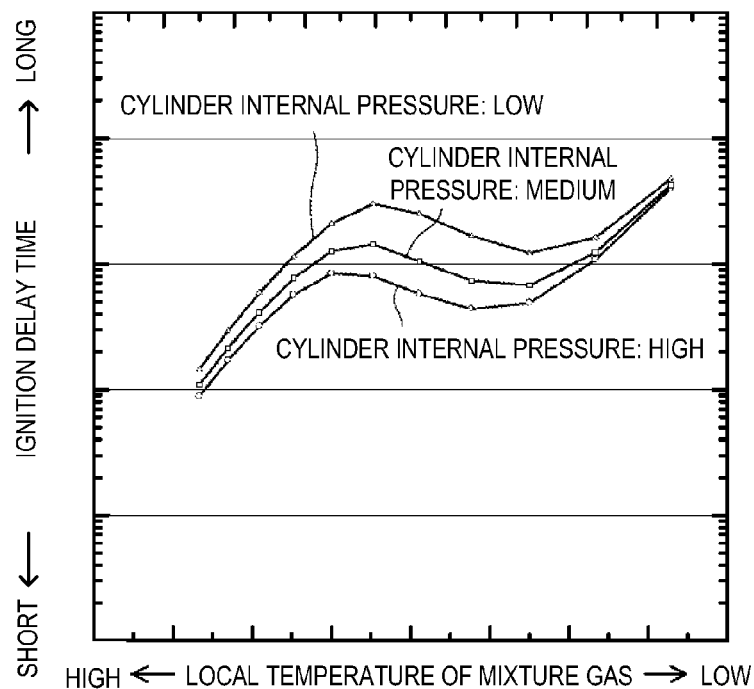
FIG. 4B is a chart showing an example of a relation of the ignition delay relative to the local temperature when a cylinder internal pressure is changed.

FIGS. 4A and 4B show examples of simulation results by analyzing the cylinder internal compression ignition (self ignition in a low temperature) phenomena by using a chemical reaction simulation software. FIG. 4A shows relations of a change in the ignition delay relative to a change in the local temperature of the mixture gas when the local equivalence ratio ø of the mixture gas is changed from low (ø=1.0), medium (ø=2.0) and to high (ø=3.0), respectively, under a predetermined cylinder internal pressure (e.g., 4 MPa). An area of the local temperature plotted in FIG. 4A corresponds to a range of 700 to 1200 K. As shown in FIG. 4A, the ignition delay becomes longer as the local equivalence ratio becomes lower and the ignition delay becomes shorter as the local equivalence ratio becomes higher. Further, basically, when the equivalence ratio is constant, the ignition delay becomes shorter as the local temperature becomes higher (toward the left in FIG. 4A) and the ignition delay becomes longer as the local temperature becomes lower (toward the right in FIG. 4A). However, the ignition delay does not change uniformly corresponding to the change of the local temperature, and a temperature zone exists where the ignition delay becomes longer when the local temperature is changed from the low temperature side to the high temperature side.

Further, FIG. 4B shows a relation of a change in the ignition delay relative to a change of the local temperature of the mixture gas when the cylinder internal pressure is changed from low (P=2 MPa), medium (P=3 MPa) and to high (P=4 MPa), respectively, under a predetermined local equivalence ratio (ø=1.0). An area of the local temperature plotted in FIG. 4B also corresponds to the range of 700 to 1200 K. As shown in FIG. 4B, the ignition delay becomes longer as the cylinder internal pressure becomes lower and the ignition delay becomes shorter as the cylinder internal pressure becomes higher. Further, basically, when the cylinder internal pressure is constant, the ignition delay becomes shorter as the local temperature becomes higher (toward the left in FIG. 4B) and the ignition delay becomes longer as the local temperature becomes lower (toward the right in FIG. 4B). However, the ignition delay does not change uniformly corresponding to the change of the local temperature, and a temperature zone exists where the ignition delay becomes longer when the local temperature is changed from the low temperature side to the high temperature side.

The reason why the ignition delay does not change uniformly corresponding to the change of the local temperature of the mixture gas may be considered as follows. That is, when self-igniting in a low temperature, a hot flame accompanied by the heat generation and low temperature flame, which is called a cold flame and is generated before the hot flame, are generated and a temperature range where the cold flame reaction is active exists. That is, within the temperature where the cold flame reaction is active, the cold flame lasts for a long time period and, then, the hot flame reaction is generated afterwards, and therefore a time period prior to generating the hot flame reaction is long, in other words, the ignition delay within the cylinder becomes long.

Figure 5:
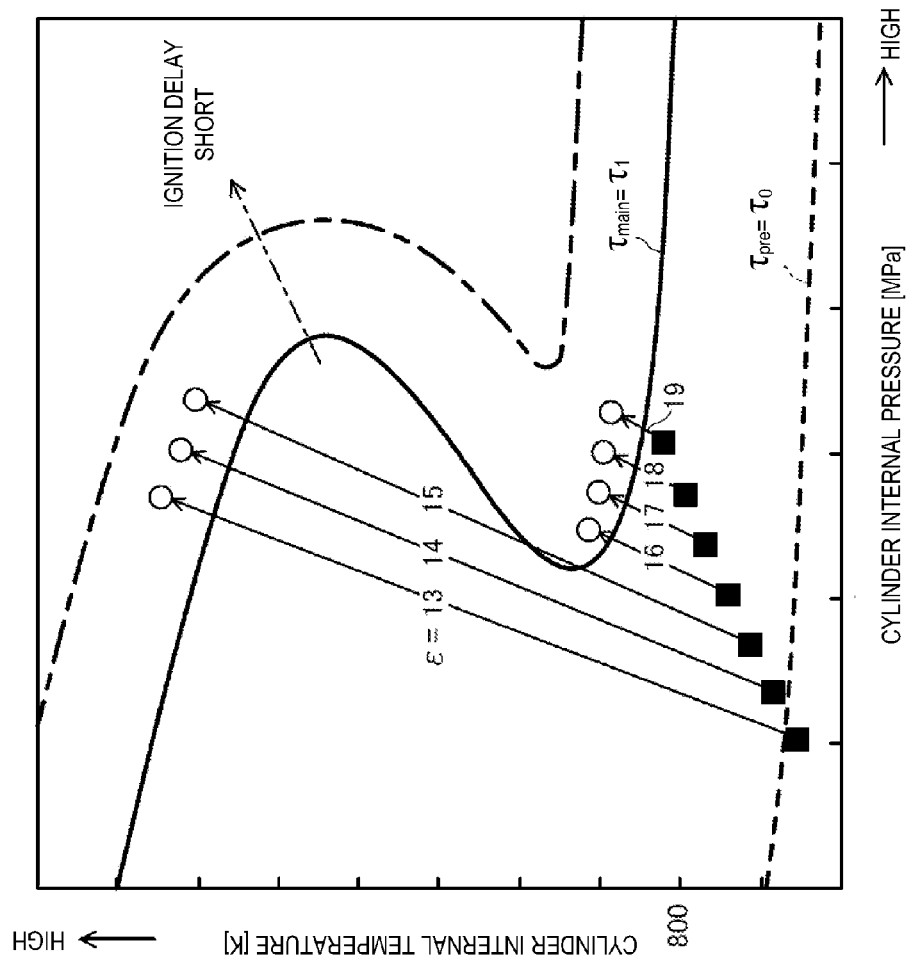
FIG. 5 is an example of a contour chart relating to an ignition delay on a temperature-pressure plane in which a temperature and a pressure at the end of a compression stroke are utilized as parameters.

Based on such simulation results illustrated in FIGS. 4A and 4B, a contour chart can be created as illustrated in FIG. 5, which includes isochrone lines drawn by connecting temperature-pressure states in which the ignition delay is constant on a temperature-pressure plane where the vertical axis indicates the cylinder internal temperature and the horizontal axis indicates the cylinder internal pressure. The isochrone line indicated by the solid line in FIG. 5 corresponds to, for example, the local equivalence ratio $\varnothing=3:1$, the ignition delay $\tau=0.2$ msec, and the isochrone line indicated by the broken line in FIG. 5 corresponds to, for example, the local equivalence ratio $\varnothing=1:1$, the ignition delay $\tau=1.5$ msec. In the contour chart, the locations of the isochrone lines change corresponding to the change of the local equivalence ratio $\varnothing$ (not illustrated). Specifically, the isochrone lines are located further right or above as the local equivalence ratio becomes lower and the ranges on the left of or below the respective isochrone lines become larger, and the isochrone lines are located further left or below as the local equivalence ratio becomes higher and the ranges on the left of or below the respective isochrone lines become smaller. Further, as indicated by the dot-dashed line arrow and the dot-dashed line of the contour chart in FIG. 5 as an example, the isochrone line is located further right or above as the ignition delay becomes shorter. Therefore, when the cylinder internal temperature-pressure state is, for example, within a range on the right of or above the isochrone line indicated by the solid line, the ignition delay is shorter than 0.2 msec, and, on the other hand, when the cylinder internal temperature-pressure state is, for example, within a range on the left of or below the isochrone line indicated by the solid line, the ignition delay is longer than 0.2 msec. In order to, for example, shorten the ignition delay of the fuel injected by the main injection to improve the controllability of the main combustion, the cylinder internal temperature-pressure state at the start of the main injection needs to be within the range on the right of or above the isochrone line indicated by the solid line in FIG. 5, and, therefore, the isochrone line indicated by the solid line in FIG. 5 can be defined as the isochrone line for, for example, setting the ignition delay $\tau_{main}$ relating to the main injection to $\tau_1$ (=0.2 msec). Here, the isochrone line of $\tau_1$ is preferably appropriately set so that the equivalence ratio $\varnothing=1:1$ to 1:3 and $\tau_1=0.1$ to 0.3 msec. The ignition delay longer than 0.3 msec generates a steep slope of the heat release rate of the main combustion and degrades the NVH performance. On the other hand, the ignition delay shorter than 0.1 msec shortens the penetrating distance of the injected fuel and causes the degradation in the mixture gas formation, and therefore, the exhaust emission performance degrades.

The isochrone line indicated by the broken line in FIG. 5 can be defined as the isochrone line for setting the ignition delay $\tau_{pre}$ relating to, for example, the pre-injections to $\tau_0$ (=1.5 msec). When the cylinder internal temperature-pressure state at the start of the pre-injections is within a range on the left of or below the isochrone line of the broken line in FIG. 5, the ignition delay of the fuel injected by the pre-injections is too long to cause the pre-combustion at the predetermined timing before the TDC of the compression stroke. The isochrone line of $\tau_0$ may be set so that the equivalence ratio $\varnothing=1:1$ to 1:3 and $\tau_0 \leq 1.5$ msec. Thereby, the peak of the heat release rate of the pre-combustion can further surely be generated before the TDC of the compression stroke and benefits in improving the controllability of the main combustion.

The pre-combustion is the combustion for shifting the temperature-pressure state from the states indicated by the black squares to the states indicated by the white circles in FIG. 5 due to the increase of the cylinder internal temperature and pressure. As described above, because the state of the cylinder internal temperature and pressure at the start of the main injection needs to be within the range on the right of or above the isochrone line indicated by the solid line in FIG. 5, the pre-combustion may be translated as the combustion for the cylinder internal state to cross the isochrone line(s) as indicated by the solid line arrows in FIG. 5 so as to shift from the range on the left of or below the isochrone line to the range on the right of or above thereof.

Here, as described above with reference to FIGS. 4A and 4B, due to the ignition delay not changing linearly corresponding to the temperature change inside the cylinder, the isochrone lines have a two-stage characteristic in which the cylinder internal temperature is relatively high within an area where the cylinder internal pressure is comparatively low (an area on a relatively left side in FIG. 5) (hereinafter, the corresponding part of the isochrone line may be referred to as "the high temperature part") and, on the other hand, the cylinder internal temperature is significantly low within an area of the isochrone lines where the cylinder internal pressure is comparatively high (an area on the relatively right side in FIG. 5) compared to the high temperature part (hereinafter, the corresponding part of the isochrone line may be referred to as "the low temperature part"). The isochrone lines have an inverted S curve shape.

While the geometric compression ratio of the engine 1 is set comparatively low, the black squares in FIG. 5 indicate the temperature-pressure states (i.e., the temperature and the pressure under motoring) at the end of the compression stroke of the engine under predetermined operating conditions (the engine speed=1,000 rpm, no engine load, the engine coolant=10° C., the outside air temperature=−25° C., and the altitude is low, which are examples of the representative conditions of a low outside air temperature, a low coolant temperature, and a low engine load, which tend to cause the ignition to be unstable) when the geometric compression ratio $\epsilon$ is changed within a range of 13:1 to 19:1, respectively. In FIG. 5, the temperature-pressure state is located further in the lower left as the geometric compression ratio $\epsilon$ is set lower and further in the upper right as the geometric compression ratio $\epsilon$ is set higher. In consideration of shifting the black squares toward the white circles by crossing the isochrone line(s) in association with the pre-combustion, because the black squares are located on the relatively left side in FIG. 5 when the geometric compression ratio $\epsilon$ is comparatively low: 13:1, 14:1 and 15:1, the black squares are shifted to the white circles by crossing the high temperature part of the isochrone line, and, because the black squares are located on the relatively right side in FIG. 5 when the geometric compression ratio $\epsilon$ is comparatively high: 16:1, 17:1, 18:1 and 19:1, the black squares are shifted to the white circles by crossing the low temperature part of the isochrone line. Here, the lengths of the arrows connecting the black squares and the white circles, respectively, correspond to the injection amount of fuel which is injected by the pre-injections, and the fuel injection amount becomes larger as the length of the arrow becomes longer and the fuel injection amount becomes less as the length of the arrow becomes shorter. Therefore, in a comparatively high compression ratio engine where the geometric compression ratio $\epsilon$ is 16:1 or higher, the fuel injection amount to be injected by the pre-injections becomes less because the black squares can cross the low temperature part of the isochrone line by the pre-combustion, and, in a comparatively low compression ratio engine where the geometric compression ratio $\epsilon$ is 15:1 or lower ($\epsilon$=13:1, 14:1 or 15:1), the fuel injection amount to be injected by the pre-injections becomes significantly large because the black squares need to cross the high temperature part of the isochrone line by the pre-combustion.

Therefore, in the diesel engine 1, as described above, the pressure (and the temperature) inside each of the cylinders 11a is increased by the turbocharging to reduce the injection amount required for the pre-injections. Specifically, as indicated by the white arrow in FIG. 6, by performing the turbocharging, the state inside each of the cylinders before the pre-combustion moves to the upper right direction, from the black square with the symbol $C_{00}$ to the black square with the symbol $C_{01}$ on the temperature-pressure plane. Thereby, the cylinder internal temperature-pressure state before the pre-combustion can move to near the low temperature part, cross the low temperature part of the isochrone line by the pre-combustion, and shift to the white circle with the symbol $C_{11}$. Thus, the fuel injection amount by the pre-injections is significantly reduced compared to the case of shifting from the black square with the symbol $C_{00}$ to the white circle with the symbol $C_{10}$ by crossing the high temperature part of the isochrone line. Therefore, the reduction of the fuel injection amount to be injected by the pre-injections is achieved while the controllability of the main combustion is improved by optimizing the cylinder internal temperature-pressure state at the start of the main injection by the pre-combustion to shorten the ignition delay for the main combustion.

Figure 7:
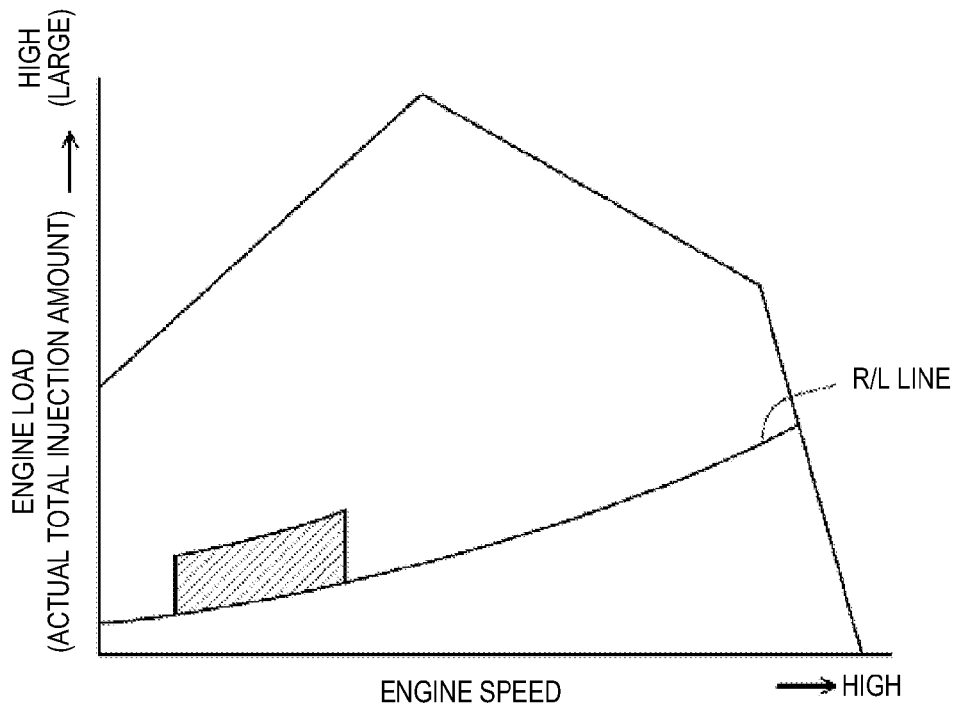
FIG. 7 is a chart illustrating an operating range of the diesel engine where the particular control is performed.

As shown in the hatched area in FIG. 7, such particular control is performed within the range where the engine speed is low and the engine load is partial when the engine 1 is in the non-warmed-up state, further specifically, within, for example, a low engine speed range when the range of the engine speed is divided into three ranges: low, middle and high ranges, and within a range where the engine load is slightly higher than the exemplary road-load line illustrated in FIG. 7. That is, performing the particular control corresponds to securing the predetermined or higher level of turbocharging and increasing the cylinder internal pressure (and temperature) so that the low temperature part of the isochrone line can be crossed by the pre-combustion within the operating range where, conventionally, the turbocharging is substantially not performed because the rotation speed of the engine 1 is low and the torque is hardly required because the engine load is low.

Figure 6:
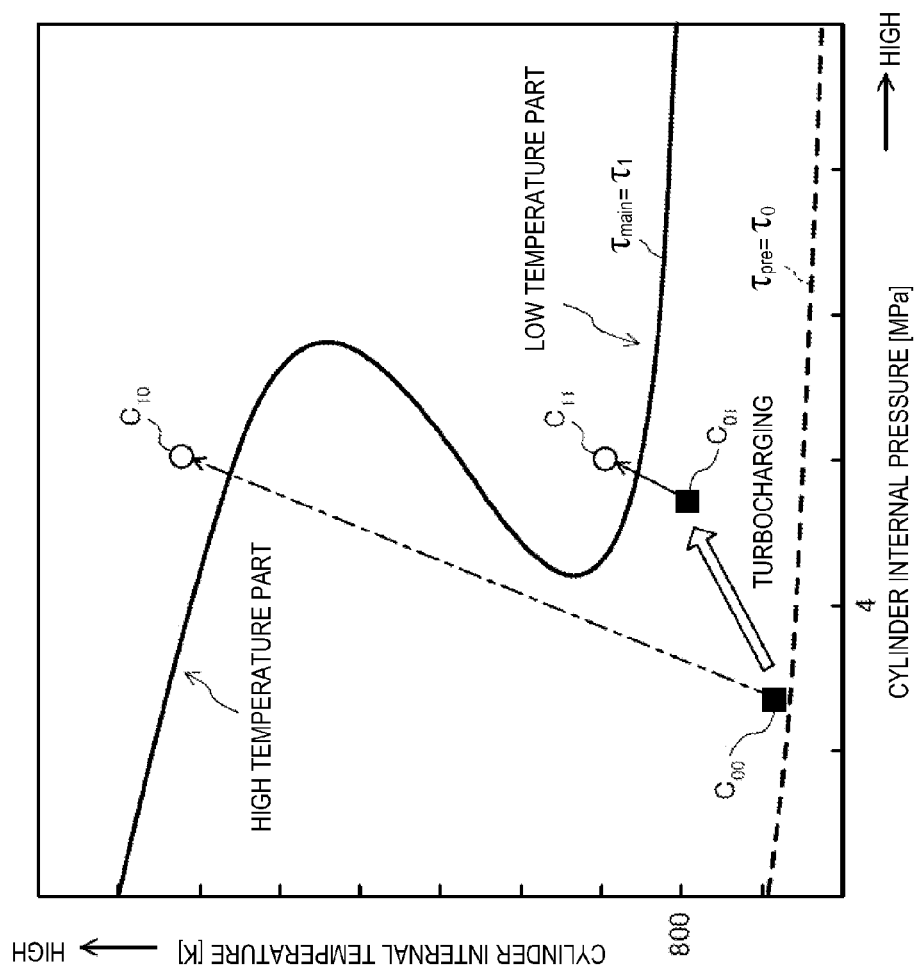
FIG. 6 is a contour chart illustrating a particular control performed by a control device of the diesel engine.
Figure 8:
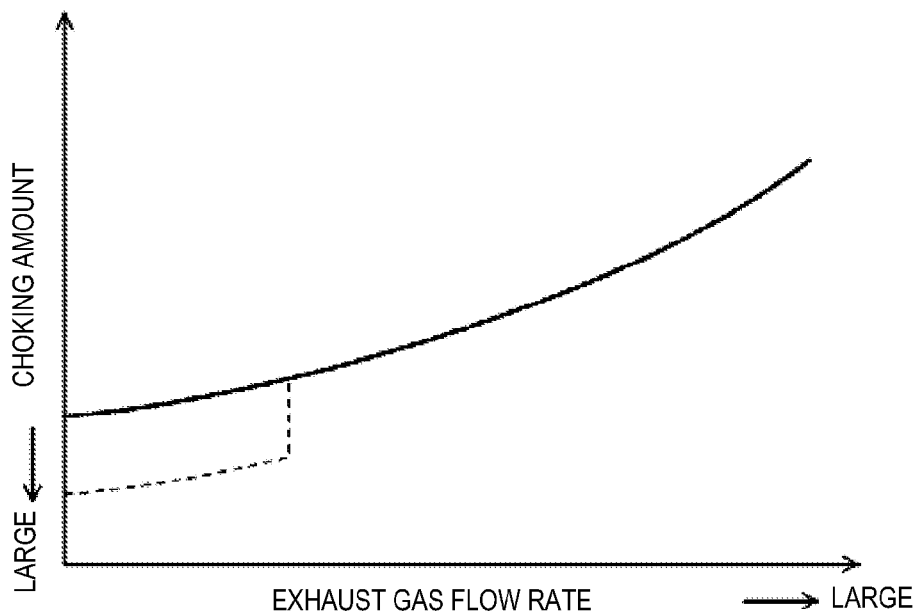
FIG. 8 is a chart illustrating normal operating characteristics of a VGT (solid line) and characteristics of the VGT when the particular control is performed (broken line).

That is, the particular control in the diesel engine 1 secures the predetermined or higher level of turbocharging within the range where the turbocharging is conventionally not required, for the purpose of reducing the injection amount to be injected by the pre-injections and not for the purpose of improving the torque based on the knowledge that the isochrone lines relating to the ignition delay have the two-stage characteristic (the inverted S curve characteristic) including the high temperature part and the low temperature part in the contour charts on the temperature-pressure planes as shown in FIGS. 5 and 6. Therefore, in the particular control, the PCM 10 fully closes the compact intake bypass valve 63a and the regulation valve 64a. Note that, the regulation valve 64a may not be fully closed and set to open by an amount where the flow rate in the compact exhaust bypass passage 64 is reduced so that the compact turbocharger 62 sufficiently operates to increase the level of turbocharging. Accordingly, through the control of the movable vanes 62c of the compact turbocharger 62, the required level of turbocharging is secured. As shown in FIG. 8, in a normal operating state of the engine 1, the choking amount of the movable vanes 62c is controlled with a characteristic where the choking amount of the movable vanes 62c increases generally uniformly corresponding to the increase of the exhaust gas flow rate (see the solid line in FIG. 8), and, when the engine 1 is in the non-warmed-up state, within the operating range where the engine speed is low and the engine load is partial where the turbocharging is conventionally substantially not performed and the particular control is performed, the choking amount of the movable vanes 62c is further increased (see the broken line in FIG. 8). For example, the turnable angle range of the movable vanes 62c may be widened so that the choking amount of the movable vanes 62c can further be larger than the configuration of the conventional movable vane. Thereby, the predetermined or higher level of turbocharging can be secured through the operation of the compact turbocharger 62 when the rotation speed of the engine 1 is low and the exhaust gas flow rate is slow.

The phrase "the predetermined or higher level of turbocharging" corresponds to, for example, the length of the white arrow in the contour chart shown in FIG. 6 and can be defined as the level of turbocharging that can move the state inside the cylinder to be near the low temperature part of the isochrone line corresponding to a target ignition delay, and further, be able to cross the low temperature part by the pre-combustion. That is, when the level of turbocharging is low, in other words, the length of the white arrow is short, the state inside the cylinder indicated by, for example, the black square with the symbol $C_{00}$ cannot be moved to a location near the low temperature part of the isochrone line and not be able to cross the low temperature part by the pre-combustion. Therefore, the predetermined or higher level of turbocharging is required to reduce the fuel injection amount by the pre-injections, and the predetermined level of turbocharging is set according to a relative distance from the state of the cylinder internal temperature and pressure to the isochrone line corresponding to the target ignition delay.

Note that, although the exhaust resistance increases by increasing the choking amount of the movable vanes 62c, the combustion stability within the operating range where the particular control is performed is relatively low because the engine load is low and the fuel injection amount is small, essentially. Therefore, the increase of the fuel injection amount due to the increase of the exhaust resistance is beneficial in improving the combustion stability.

Further, within the range where the engine load is higher than within the operating range where the particular control is performed, the injection amount by the pre-injections increases due to the increase of the total fuel injection amount as a result of the increase of the engine load and, thereby, even the high temperature part of the isochrone line can be crossed by utilizing the pre-combustion, and, within the range where the engine speed is higher than that within the operating range where the particular control is performed, because the level of turbocharging increases due to the increase of the engine speed, the state of the inside cylinder automatically reaches a pressure area which is relatively right of the contour chart, and thus the injection amount by the pre-injections is comparatively reduced.

Moreover, the particular control is performed when the engine 1 is in the non-warmed-up state. As described above, in addition/alternative to the above condition, the particular control may be performed under the condition where the outside air temperature is 0° C. or lower and/or the condition where the altitude is 1,000 m or higher in which the ignitability within the cylinder 11*a* decreases. The conditions where the engine 1 is in the non-warmed-up state and the outside air temperature is low correspond to moving the positions of the black squares that indicate the state inside the cylinder before the pre-combustion generally downward in the contour charts shown in FIGS. 5 and 6, and the condition where the air density is low corresponds to moving the positions of the black squares generally leftward or downward, and both are directions away from the isochrone lines. Therefore, when the operating state of the engine 1 is within the range where the engine speed is low and the engine load is partial and in the low temperature state in which the temperature inside the engine 1 at the end of the compression stroke is lower than the predetermined temperature, securing the predetermined or higher level of turbocharging benefits in reducing the fuel injection amount by the pre-injections. Conversely, when in the high temperature state in which the temperature at the end of the compression stroke is the predetermined temperature or higher, the ignition delay for the main combustion can be shortened by the pre-injections with a comparatively small amount of fuel without increasing the level of turbocharging much.

Note that, as the control of the diesel engine 1, a control may be performed in which the contour chart shown in FIG. 5 or 6 is stored in the PCM 10 in advance as a map, then the cylinder internal temperature-pressure state, the black square, is estimated through the detections of the various parameters, and, thereby, the level of turbocharging and the pre-injection amount are set according to the position of the black square. Alternatively, a control may be performed in which a model relating to the ignition delay is stored in the PCM 10 instead of storing the contour charts as the maps, the cylinder internal temperature-pressure state (the black square) and the isochrone line are estimated based on the detections of the various parameters and the model, and the turbocharging amount and the pre-injection amount are determined accordingly.

Further, in the above configuration, as for the configuration of the turbochargers, the VGT is adopted as the compact turbocharger of the two-stage turbo; however, the configuration may be a two-stage turbo where the compact turbocharger is a normal turbocharger instead of the VGT (the large turbocharger is also a normal turbocharger), or may be a two-stage turbo where both the compact and large turbochargers are the VGTs. Alternatively, the configuration may be a single turbo instead of the two-stage turbo.

Regarding to the configuration of the turbochargers, under the particular control, when either one of the configurations of the two-stage turbo is adopted, the flow rate of the exhaust gas in the compact exhaust bypass passage for bypassing the compact turbine of the compact turbocharger may be reduced (to be substantially zero) through the control of the regulation valve, and, when the configuration of the single turbo of the VGT is adopted, the flow rate of the exhaust gas in a bypass passage for bypassing the VGT may be reduced (to be substantially zero) through a valve control and a vane control of the VGT may be performed at the same time.

Figure 10:
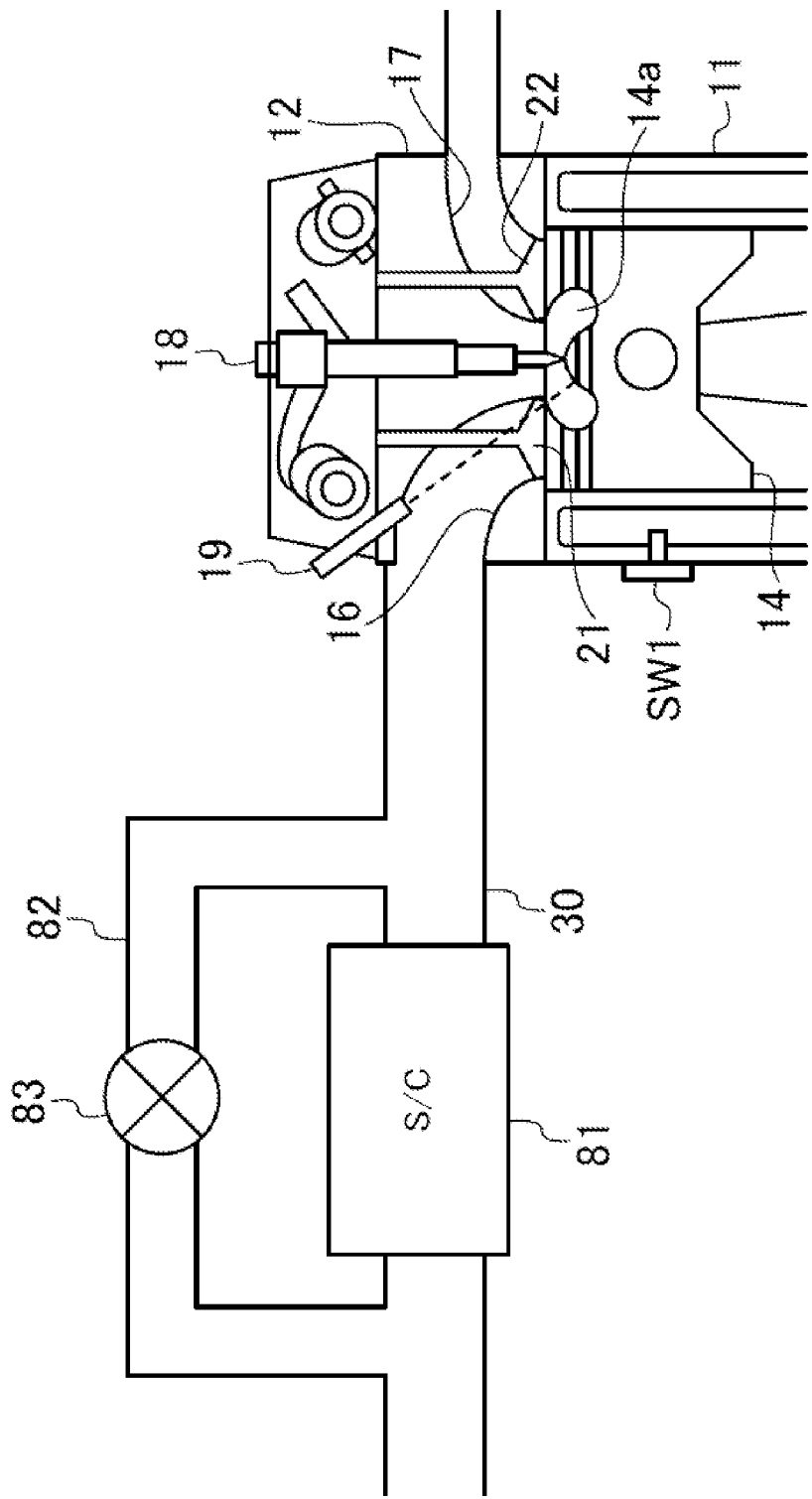
FIG. 10 is a diagram showing an example of a configuration in which a supercharger is arranged in an intake system of the diesel engine.

Further, as schematically shown in FIG. 10, a mechanically operated compressor, for example a supercharger 81 operated by the engine 1, may be arranged in the intake passage 30 alternative to the turbochargers. In this configuration, a bypass passage 82 for bypassing the supercharger 81 may be formed and an adjusting valve 83 for adjusting the flow rate may be interposed in the bypass passage 82. Under the particular control, the required level of supercharging may be secured by reducing the flow rate in the bypass passage 82 (to be substantially zero) through the control of the adjusting valve 83 and operating the supercharger 81. Further, an electric assist turbo (not illustrated) in which an electric motor is attached to a turbine shaft may be attached alternative to the supercharger 81 and, under the particular control, the electric assist turbo may be forced to be operated.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

Explanation of Reference Characters
1 Diesel engine (engine unit)
10 PCM (powertrain control module/injection control module)
11*a* Cylinders
18 Injectors (fuel injection valves)
61 Large turbocharger
62 Small turbocharger
62*c* Movable vanes

The invention claimed is:
1. A control device for a diesel engine, comprising:
an engine body having a geometric compression ratio of 15:1 or lower and for compressing fuel supplied to a cylinder to cause a self-ignition;
a forced induction system for forcibly inducting intake air into the cylinder;
a fuel injection valve arranged so as to be oriented toward the cylinder and for directly injecting the fuel into the cylinder; and
an injection control module for controlling a mode of injecting the fuel into the cylinder through the fuel injection valve;
wherein, when the engine body is within a particular operating range where an engine speed is low and an engine load is partial and in a low temperature state in which a cylinder temperature at an end of a compression stroke is lower than a predetermined temperature, a forcibly inducting level by the forced induction system is set higher than a predetermined level that is higher than that in a high temperature state in which the cylinder temperature is above the predetermined temperature; and
wherein, at least within the particular operating range, the injection control module performs a main injection where a fuel injection starts at or before a top dead center of the compression stroke to cause main combustion mainly including diffusion combustion and performs a pre-stage injection where the fuel injection is performed at least once prior to the main injection to cause pre-stage combustion before the main combustion starts.

2. The control device of claim 1, wherein the forced induction system is a two-stage turbocharger including a first turbocharger having a turbine with a relatively small volume and a second turbocharger having a turbine with a relatively large volume that are arranged in an exhaust passage of the engine body, and, when the engine body is at least within the particular operating range and in the low temperature state, the predetermined or higher forcibly inducting level is secured by operating the first turbocharger.

3. The control device of claim 1, wherein the forced induction system is a variable geometry turbocharger in which movable vanes are provided to a turbine arranged in an exhaust passage of the engine body, and, when the engine body is at least within the particular operating range and in the low temperature state, the predetermined or higher forcibly inducting level is secured by choking an opening of the vanes to operate the turbocharger.

4. The control device of claim 1, further comprising a bypass passage for bypassing the forced induction system and an adjusting valve for adjusting a flow rate in the bypass passage;
wherein, when the engine body is at least within the particular operating range and in the low temperature state, the predetermined or higher forcibly inducting level is secured by reducing the flow rate in the bypass passage.

5. The control device of claim 4, wherein the forced induction system is a variable geometry turbocharger in which movable vanes are provided to a turbine arranged in an exhaust passage of the engine body;
wherein the bypass passage bypasses the turbine; and
wherein, when the engine body is at least within the particular operating range and in the low temperature state, the predetermined or higher forcibly inducting level is secured by reducing the flow rate in the bypass passage and choking an opening of the vanes to operate the forced induction system.

6. The control device of claim 4, wherein the forced induction system is a two-stage turbocharger including a first turbocharger having a turbine with a relatively small volume and a second turbocharger having a turbine with a relatively large volume that are arranged in an exhaust passage of the engine body;
wherein the bypass passage bypasses the turbine of the first turbocharger; and
wherein, when the engine body is at least within the particular operating range and in the low temperature state, the predetermined or higher forcibly inducting level is secured by reducing the flow rate in the bypass passage.

7. The control device of claim 1, wherein, when the engine body is at least within the particular operating range, the injection control module performs a plurality of injections as the pre-stage injection at timings in which the fuel injected by each of the injections reaches within a cavity formed in a top surface of a piston fitted in the cylinder.

8. The control device of claim 1, wherein, on a temperature-pressure plane having cylinder internal temperature and pressure as parameters, the engine body has a two-stage characteristic including a high temperature part and a low temperature part, in which the cylinder internal temperature is relatively high when an isochrone line drawn by connecting temperature-pressure states in which an ignition delay of the fuel injected into the cylinder through the fuel injection valve is constant is within an area where the cylinder internal pressure is comparatively low and, on the other hand, the cylinder internal temperature is relatively low when the isochrone line is within an area where the cylinder internal pressure is comparatively high;
wherein the pre-stage injection increases the cylinder internal pressure and temperature associated with an occurrence of the pre-stage combustion to obtain the cylinder internal temperature-pressure state at a start of the main injection so that the ignition delay is shorter than a predetermined ignition delay, and the pre-stage combustion corresponds to crossing the isochrone line corresponding to the predetermined ignition delay on the temperature-pressure plane; and
wherein, when the engine body is within the particular operating range and in the low temperature state, a predetermined or higher forcibly inducting level is secured by the forced induction system to increase at least the cylinder internal pressure so that the cylinder internal pressure-temperature state before the pre-stage combustion is positioned to near the low temperature part of the isochrone line with the two-stage characteristic and, thereby, crosses the low temperature part of the isochrone line by utilizing the pre-stage combustion.

9. The control device of claim 1, wherein the injection control module controls injection modes of the pre-stage injection and the main injection so that a heat release rate of the pre-stage combustion reaches a peak, the heat release rate starts to decrease, and then, a heat release rate of the main combustion starts to increase.

10. The control device of claim 1, wherein the injection control module controls injection modes of the pre-stage injection and the main injection so that an ignition delay from a start of the main injection to a start of the main combustion is 0.1 to 0.3 msec by the pre-stage combustion increasing the cylinder internal temperature and pressure.

11. A method of controlling a diesel engine with a forced induction system in which a geometric compression ratio is set to 15:1 or lower and fuel supplied to a cylinder is compressed to cause a self-ignition, comprising:
controlling, when the diesel engine is within a particular operating range where an engine speed is low and an engine load is partial and in a low temperature state in which a cylinder temperature at an end of a compression stroke is lower than a predetermined temperature, a forcibly inducting level by the forced induction system to be higher than a predetermined level that is higher than that in a high temperature state in which the cylinder temperature is above the predetermined temperature;
performing, at least within the particular operating range, a pre-stage injection where a fuel injection is performed at least once at a predetermined timing to cause pre-stage combustion before main combustion mainly including diffusion combustion starts; and
starting, after the pre-stage injection, a main injection for causing the main combustion at or before a top dead center of the compression stroke.

12. The method of claim 11, wherein the forced induction system is a two-stage turbocharger including a first turbocharger having a turbine with a relatively small volume and a second turbocharger having a turbine with a relatively large volume that are arranged in an exhaust passage of the diesel engine; and
wherein, when the diesel engine is at least within the particular operating range and in the low temperature state, the first turbocharger is operated.

13. The method of claim 11, wherein the forced induction system is a variable geometry turbocharger in which movable vanes are provided to a turbine arranged in an exhaust passage of the diesel engine; and
wherein, when the diesel engine is at least within the particular operating range and in the low temperature state, an opening of the vanes is choked to operate the turbocharger.

14. The method of claim 11, wherein, when the diesel engine is at least within the particular operating range and in the low temperature state, a flow rate in a bypass passage for bypassing the forced induction system is reduced.

15. The method of claim 14, wherein the forced induction system is a variable geometry turbocharger in which movable vanes are provided to a turbine arranged in an exhaust passage of the diesel engine; and
　　wherein, when the diesel engine is at least within the particular operating range and in the low temperature state, the flow rate in a bypass passage for bypassing the forced induction system is reduced and an opening of the vanes is choked to operate the forced induction system.

16. The method of claim 14, wherein the forced induction system is a two-stage turbocharger including a first turbocharger having a turbine with a relatively small volume and a second turbocharger having a turbine with a relatively large volume that are arranged in an exhaust passage of the diesel engine; and
　　wherein, when the diesel engine is at least within the particular operating range and in the low temperature state, the flow rate in the bypass passage for bypassing the turbine of the first turbocharger is reduced.

17. The method of claim 11, wherein, when the diesel engine is at least within the particular operating range, a plurality of injections are performed as the pre-stage injection at timings in which the fuel injected by each of the injections reaches within a cavity formed in a top surface of a piston fitted in the cylinder.

18. The method of claim 11, wherein, on a temperature-pressure plane having cylinder internal temperature and pressure as parameters, the diesel engine has a two-stage characteristic including a high temperature part and a low temperature part, in which the cylinder internal temperature is relatively high when an isochrone line drawn by connecting temperature-pressure states in which an ignition delay of the fuel injected into the cylinder is constant is within an area where the cylinder internal pressure is comparatively low and, on the other hand, the cylinder internal temperature is relatively low when the isochrone line is within an area where the cylinder internal pressure is comparatively high;
　　wherein when the diesel engine is within the particular operating range and in the low temperature state, a predetermined or higher forcibly inducting level is secured by the forced induction system to increase at least the cylinder internal pressure so that the cylinder internal pressure-temperature state before the pre-stage combustion moves to near the low temperature part of the isochrone line with the two-stage characteristic; and
　　wherein, by performing the pre-stage combustion, the cylinder internal temperature-pressure state crosses the low temperature part of the isochrone line.

19. The method of claim 11, wherein injection modes of the pre-stage injection and the main injection are determined so that a heat release rate of the pre-stage combustion reaches a peak, the heat release rate starts to decrease, and then, a heat release rate of the main combustion starts to increase.

20. The method of claim 11, wherein injection modes of the pre-stage injection and the main injection are determined so that an ignition delay from a start of the main injection to a start of the main combustion is 0.1 to 0.3 msec by the pre-stage combustion increasing the cylinder internal temperature and pressure.

* * * * *